US010256720B2

(12) United States Patent
Ozanoglu et al.

(10) Patent No.: US 10,256,720 B2
(45) Date of Patent: Apr. 9, 2019

(54) BUCK-BOOST CONVERTER USING HYSTERETIC CONTROL

(71) Applicant: Dialog Semiconductor (UK) Limited, London (GB)

(72) Inventors: Kemal Ozanoglu, Istanbul (TR); Guillaume de Cremoux, Edinburgh (GB); Pier Cavallini, Swindon (GB); Martin Faerber, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/475,537

(22) Filed: Mar. 31, 2017

(65) Prior Publication Data

US 2018/0287489 A1    Oct. 4, 2018

(51) Int. Cl.
| | |
|---|---|
| H02M 1/00 | (2006.01) |
| H02M 3/04 | (2006.01) |
| H02M 1/14 | (2006.01) |
| H02M 1/15 | (2006.01) |
| H02M 3/158 | (2006.01) |

(52) U.S. Cl.
CPC ............... *H02M 3/04* (2013.01); *H02M 1/14* (2013.01); *H02M 1/15* (2013.01); *H02M 3/1582* (2013.01); *H02M 2001/0003* (2013.01); *H02M 2001/0054* (2013.01); *Y02B 70/1491* (2013.01)

(58) Field of Classification Search
CPC ...................................................... H02M 3/04
See application file for complete search history.

(56) References Cited

U.S. PATENT DOCUMENTS

| | | | |
|---|---|---|---|
| 7,495,419 B1 * | 2/2009 | Ju | G05F 1/62 323/225 |
| 7,804,282 B2 | 9/2010 | Bertele | |
| 8,018,212 B1 | 9/2011 | Petricek | |

(Continued)

FOREIGN PATENT DOCUMENTS

| | | |
|---|---|---|
| CN | 106130344 | 11/2016 |
| DE | 2 323 482 | 11/1974 |

OTHER PUBLICATIONS

"Buck-Boost Converter Controlled by Hysteretic PWM Method with Input Voltage Feedforward," by Tomonori Watanabe et al., 2011 IEEE 33rd International Telecommunications Energy Conference (INTELEC), Oct. 9-13, 2011, 6 pgs.

(Continued)

*Primary Examiner* — Jue Zhang
*Assistant Examiner* — Trinh Q Dang
(74) *Attorney, Agent, or Firm* — Saile Ackerman LLC; Stephen B. Ackerman (57) ABSTRACT

Circuits and methods to achieve a hysteretic buck-boost converter system, separating buck and boost pulses based on monitoring a difference between the output voltage of the buck-boost converter and a reference voltage (error voltage) or alternatively based on monitoring additionally coil current or load current or both currents have been disclosed. The performance of the buck-boost converter can be further improved by using an optional output voltage change block monitoring if the output voltage rises or falls. The buck-boost converter disclosed has a very simple topology without a modulator block, which is regulating the duty cycle and without frequency compensation.

14 Claims, 9 Drawing Sheets

(56) References Cited

U.S. PATENT DOCUMENTS

| | | | |
|---|---|---|---|
| 2009/0146630 A1* | 6/2009 | Naka | H02M 1/38 323/283 |
| 2015/0002116 A1 | 1/2015 | Bernon-Enjalbert et al. | |
| 2015/0326102 A1* | 11/2015 | Radhakrishnan | H02M 1/00 323/271 |
| 2015/0338866 A1* | 11/2015 | Hu | H02M 3/157 323/280 |
| 2016/0105110 A1 | 4/2016 | Houston et al. | |
| 2016/0164412 A1* | 6/2016 | Li | H02M 3/1588 323/299 |
| 2016/0294277 A1 | 10/2016 | Romeo | |

OTHER PUBLICATIONS

German Office Action, File No. 10 2017 212 349.4, Applicant: Dialog Semiconductor (UK) Limited, dated Mar. 13, 2018, 9 pgs and English language translation, 7 pgs.

* cited by examiner

BUCK-BOOST CONVERTER USING HYSTERETIC CONTROL

TECHNICAL FIELD

This invention relates generally to DC-to-DC converters and relates more specifically to Buck-Boost converters using hysteretic control.

BACKGROUND

Figure 1A:
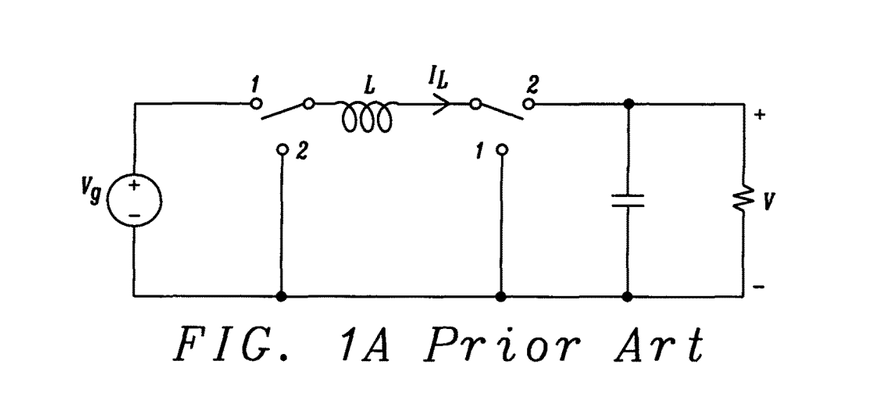
FIG. 1A Prior art shows a basic noninverting buck-boost converter.

Buck-Boost converters are used in applications where the desired output voltage (e.g. 3.3V) can be lower or higher than input (generator) voltage (e.g. $V_g$=2.5V–5.5V). FIG. 1A prior art gives an example of a typical buck-boost switch configuration. This configuration is called noninverting or positive buck-boost converter as the output voltage has the same sign as the input voltage.

The basic operating principle of a typical buck-boost converter is shown in FIG. 1A prior art. When both the switches are in phase-1 the inductor is connected to supplies and is charged with current and when both the switches are in phase-2 the inductor current charges the output capacitor. The output voltage vs. input (supply) voltage ($V_g$) as a function of duty cycle in this mode of operation for boost operation is given by:

$$\frac{Vout}{Vg} = \frac{D}{1-D} \quad (1)$$

For buck operation the formula is:

$$\frac{Vout}{Vg} = D$$

Thus the converter is capable of achieving output voltages in buck-boost operation lower or higher than the input voltage.

Figure 1B:
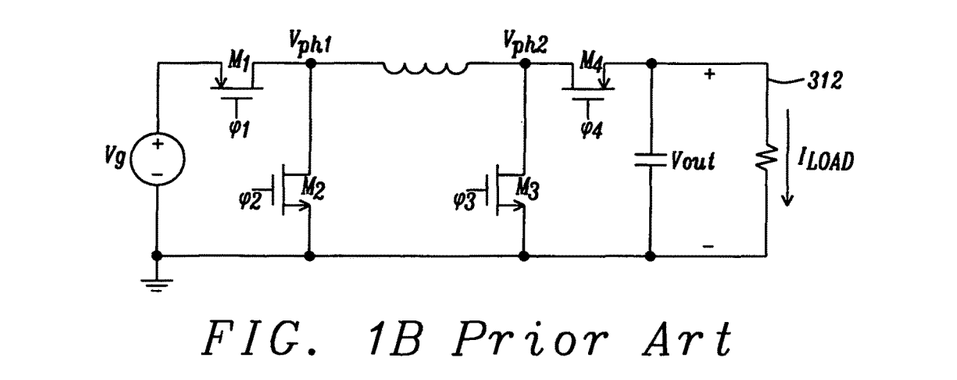
FIG. 1B Prior art depicts a basic noninverting buck-boost converter with integrated switches.

FIG. 1B prior art gives the topology of an output stage of a synchronous buck-boost controller with integrated switches.

Referring back to basic operation of FIG. 1A prior art, in phase-1 M1 and M3 will be on, M2 and M4 will be off; and in phase-2 M2 and M4 will be on and M1 and M3 will be off.

Comparing the basic Buck-Boost operation with a typical Buck or Boost converter, we can list the following disadvantages:

4 switches change state at each cycle, thus switching loss is 2 times of a typical Buck or Boost converter The average inductance current is significantly higher than the load current, given as:

$I_L = I_{LOAD}/(1-D)$ (e.g. when $D$=0.5, $V_g$=$V_{out}$, $I_L$=2× $I_{LOAD}$), which leads to increase in inductor current increase in resistive losses (e.g. for D=0.5 example, losses due to $R_{ESR,L}$ will be 4 times of a Buck At phase-1 only the capacitor is sourcing the load, thus a low ESR cap is needed.

Higher current ripple on inductor.

There is a growing demand for wearable electronic devices. However for wearable applications line transient is an important specification as the battery is very small. Voltage Mode control needs complex feedforward techniques to improve line transient response.

Hysteretic control is a preferable control method for good line transient response. Hysteretic control has other advantages such as design simplicity, ultra-low power operation and unconditional stability. Wearable applications load current is relatively low, therefore more suitable for hysteretic control.

It is desirable to have a Hysteretic Control Buck-Boost converter which employs "separated Buck and Boost pulses" thus leading to higher efficiency, lower inductance current ripple, simple design, good line transient performance, and lower quiescent power.

It is a challenge to designers to fully exploit the opportunities outlined above.

SUMMARY

A principal object of the present disclosure is to employ separated buck and boost pulses in a hysteretic buck-boost converter, thus leading to higher efficiency lower inductance current ripple simple design good line transient performance and lower quiescent power Moreover an object of the invention is to create a buck-boost converter practical for low current applications as e.g. for wearable products.

In accordance with the objects of this disclosure a hysteretic buck-boost converter system, separating buck and boost pulses based on monitoring a derivative of an output voltage of the buck-boost converter over time and monitoring a difference between the output voltage of the buck-boost converter and a reference voltage (error voltage) has been achieved. The buck-boost converter system disclosed firstly comprises a buck-boost converter configured to provide the output voltage which can be higher or lower than an input voltage of the buck-boost converter, comprising an inductor and separate switches for buck and boost operation where in a given cycle either switches for buck operation or switches for boost operation are configured to switch. Furthermore the buck-boost converter system comprises an input stage monitoring the output voltage of the buck-boost converter, comprising a sample and derivative circuit block configured to provide a derivative of the output voltage of the buck-boost converter and comprising a number of comparators connected in parallel wherein a first comparator compares the output voltage of the buck-boost converter with a reference voltage and each of the other comparators detects if the output voltage of the buck-boost falls into a voltage interval lower than the reference voltage, wherein the voltage interval is different for each of the other comparators, wherein an output of each comparator and of the circuit block providing the derivative of the output voltage of the buck-boost converter is an input to a logic and timers block. Moreover the buck-boost converter system comprises said logic and timers block, configured to define an operation region of buck or boost operation modes depending on the input of the comparators and, if the output voltage of the buck-boost converter is lower than the reference voltage, on the output of the sample and derivative circuit block, where in a given cycle the logic and timers block is configured to activate the buck or boost switches of the buck-boost converter according to the operation region defined by the logic and timers block, wherein the operation regions depend on how far the output voltage of the buck-boost converter is away from the reference voltage and on the output of the sample and derivative block.

In accordance with the objects of this disclosure a method to improve operation of buck-boost converters has been achieved. The method invented comprises the steps of: (1) providing of a hysteretic buck-boost converter comprising comparators, timer blocks, a sample and derivative circuit block to monitor a direction of an output voltage change and control logic cells; (2) designing the buck-boost converter using separate buck and boost pulses only; (3) setting cycle times for both buck mode and boost mode; and (4) monitoring an output voltage of the buck-boost converter and its derivative to define the buck or boost operation mode of the buck-boost converter.

BRIEF DESCRIPTION OF THE DRAWINGS

In the accompanying drawings forming a material part of this description, there is shown.

DETAILED DESCRIPTION

The mentioned disadvantages can be reduced if separated Buck and Boost pulses are used; which means in a given cycle, either Buck switches (M1 and M2) OR Boost switches (M3 and M4) will be switching. During Buck switching M3 will be OFF and M4 will be ON, likewise during Boost switching M1 will be ON and M2 will be OFF.

Disclosed are embodiments of buck-boost converters using separated Buck and boost pulses in a hysteretic converter. A first embodiment of the invention is based on monitoring the Error Voltage, i.e. the difference between the output voltage and a reference voltage (Vout-Vref) as given in Table 1.1:

TABLE 1.1

Error Voltage based Operating Mode regions

| Vout Condition | Buck Boost Converter Operating Mode |
| --- | --- |
| Vout > Vref | Switches Off |
| Vref > Vout > Vref-ΔV$_1$ | Buck Mode |
| Vref-ΔV$_1$ > Vout | Boost Mode |

ΔV1 and ΔV2 are defining operating mode regions. 10 mV can be used for both ΔV1 and ΔV2. If these values are too small (e.g. 1 mV), the system can be sensitive to noise e.g. operation mode can change unpredictably. If these values are too big (100 mV) then load regulation performance will degrade.

In case of more different regions more different delta-voltages could be applied.

Referring to FIG. 1B, in Buck Mode, M4=on, M3=off, and M1 & M2 will be switching. Similarly in Boost mode, M1=on, M2=off, and M3 & M4 will be switching.

However, a system defined with Table 1.1 would result in significant output voltage ripple and coil current ripple, for example during boost mode (the bottom region) coil current will continue to integrate until Vout rises above the defined threshold, after that, the integrated coil current will continue to charge the output capacitor for some time, creating unwanted voltage ripple.

So, the proposed technique will be improved by adding another monitor using a derivative of e.g. the output voltage: $\partial V_{OUT}/\partial t$.

The derivate of output voltage is the indicator of coil current value versus load current, e.g. if coil current is less that load, then output voltage be falling. Thus monitoring $\partial V_{OUT}$ helps on significant reduction of coil current ripple and output voltage ripple.

In a preferred embodiment the proposed operating principle is based on monitoring the Error Voltage, i.e. (Vout-Vref) is given with Table 1.2:

TABLE 1.2

Error Voltage and $\partial V_{out}$ based Operating Mode regions

| Vout Condition | Region | $\partial V_{out}/\partial t$ | Buck Boost Converter Operating Mode |
| --- | --- | --- | --- |
| Vout > Vref | 1 | (don't care) | Switches Off |
| Vref > Vout > Vref-ΔV$_1$ | 2 | ∂ > 0, Vout rising | Buck Mode, D = D$_{buck}$ |
|  | 3 | ∂ < 0, Vout falling | Buck Mode, D = 100% = Boost Mode, D = 0% |
| Vref-ΔV$_1$ > Vout > Vref-ΔV$_2$ | 3 | ∂ > 0, Vout rising |  |
|  | 4 | ∂ < 0, Vout falling | Boost Mode, D = D$_{boost}$ |
| Vref-ΔV$_2$ > Vout | 5 | (don't care) | Boost Mode, D = D$_{boost}$ |

In table 1.2 D stands for duty cycle in the specific operation modes. Table 1.2 illustrates a preferred embodiment of the invention with 5 regions. Alternatively a different number of regions could be implemented as well. The table 1.2 above is an example showing a preferred embodiment of the invention.

The voltage intervals Vref-ΔV1 and Vref-ΔV2 are thresholds defining ranges for the operating mode regions. As example 10 mV can be used for both ΔV1 and ΔV2. If these values are too small (e.g. 1 mV), the system can be sensitive to noise e.g. operation mode can change unpredictably. If these values are too big (100 mV) then load regulation performance will degrade.

In case of a higher number of different regions a higher number of different delta-voltages, defining the ranges of the operation modes may be used.

As an example, when [Vref>Vout>Vref−$\Delta V_1$[and Vout is rising[ (region 2), the coil current is higher than the load, then the converter will operate in Buck mode, as M1&M2 switching, M3=off, M4=on. (D=Dbuck). Switching of M2 will help reducing coil current.

As a further example, when [Vref>Vout>Vref−$\Delta V_1$] and [Vout is falling] (region 3), then more coil current is needed, then the converter will operate as M1=on, M2=off (D=100% Buck), M3=off, M4=on. In Boost mode, the system will behave similarly.

Here, region 5 is added as an "anchor" (to make sure that the converter does not get in a condition where Vout is low but rising slowly, which would create a bad transient response).

Furthermore it has to be noted that the duty cycles $D_{buck}$ and $D_{boost}$ (as defined in Table 1.2) don't have to be constant values. The duty cycle values can be adaptively set e.g. by a state machine or even by a CPU to variable values (e.g. $D_{buck1}$, $D_{buck2}$, $D_{buck3}$, $D_{buck4}$ . . . ).

The state machine can then define the duty cycles $D_{buck}$ and $D_{boost}$ depending on
- input supply voltage,
- target output voltage (Vref),
- region transitions of Vout (versus Vref) and
- derivative of Vout.

Region changes might just happen from one region to a neighboring next region, but not over neighboring regions. A change to a neighboring region can be performed only after a certain blanking time.

In other words, instead of a direct region 4 to region 2 change, the system could decide to define the changes as first region 4, then region 3 (after a certain blanking time), then region 2.

This region change function can be enabled either at both increasing and decreasing region changes or can be preferred to be implemented at only falling (or rising) region change. (For the example of FIG. 3C and FIG. 3D, only decreasing region change limitation is needed.)

Furthermore the state machine might also restrict the frequency of region changes and region transitions etc.).

The operation of switches will be better understood with simulation results (shown more below).

Figure 2A:
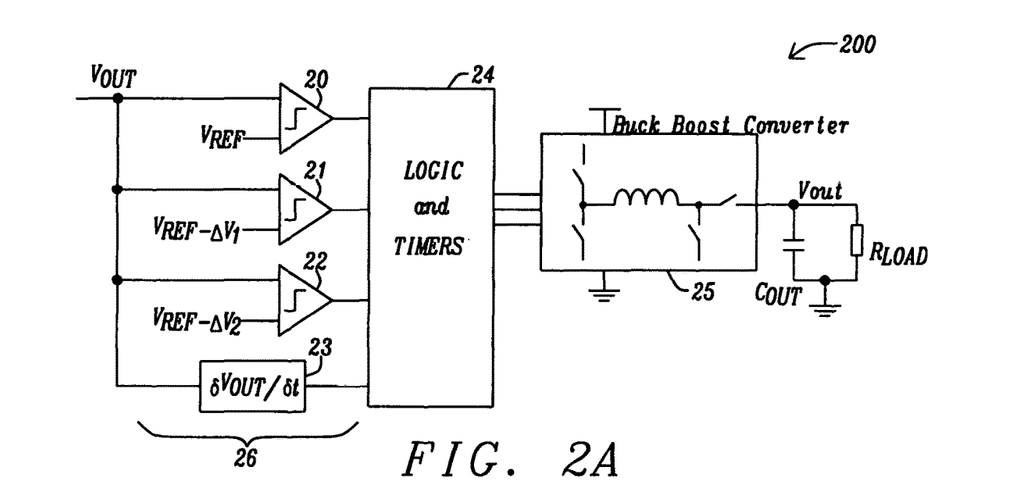
FIG. 2A illustrates a general block diagram of the proposed system.

FIG. 2A gives a general embodiment of the proposed buck-boost converter 200 as described above according to table 1.2. The input stage 26 comprises the comparators 20-22 and the output voltage change monitoring block 23, which provides in a preferred embodiment the derivative $\partial V_{OUT}/\partial t$ of the output voltage Vout, will determine together with the logic functions of the and logic and timer block 24 the operating region (1-5) and the timer functions of the logic and timer block 24 will provide constant on and constant off times for hysteretic operation. Other methods to detect changes of the output voltage are possible as well.

It should be understood that the output voltage change monitoring block 23 is not mandatory for the functionality of the buck-boost converter but it improves significantly the performance of the system.

Figure 2B:
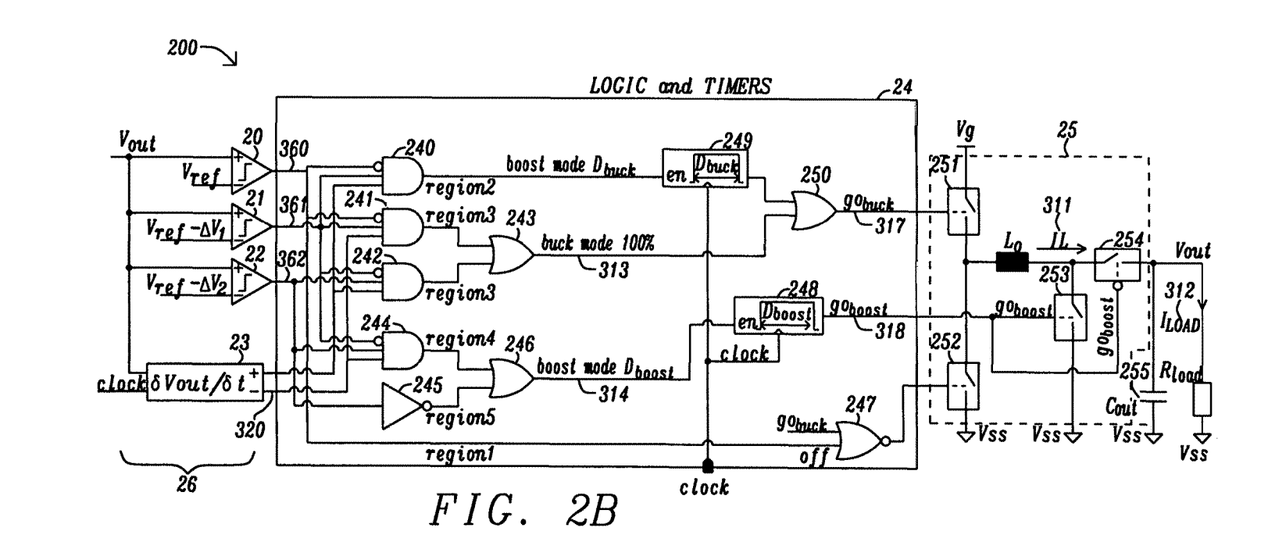
FIG. 2B illustrates a more detailed block diagram of the proposed system.

A more detailed view of a preferred embodiment of the buck-boost system proposed is shown in FIG. 2B. A first comparator 20 compares the output voltage Vout of the buck-boost converter with the reference voltage Vref. The output 360 of the comparator 20 after inversion is a first input of the AND logic block 240 and of the AND block 241.

Comparator 21 compares the output voltage Vout of the buck-boost converter with the reference voltage Vref−$\Delta V_1$. The output 361 of the comparator 21 is a second input of the AND logic block 241, a second input of the AND logic block 240 and the inverted output of the comparator 21 is a first input of the AND logic block 244.

Comparator 22 compares the output voltage Vout of the buck-boost converter with the reference voltage Vref−$\Delta V_2$. The output 362 of the comparator 22 is a second input of the AND logic block 242 and of the INVERTER logic block 245.

Figure 2C:
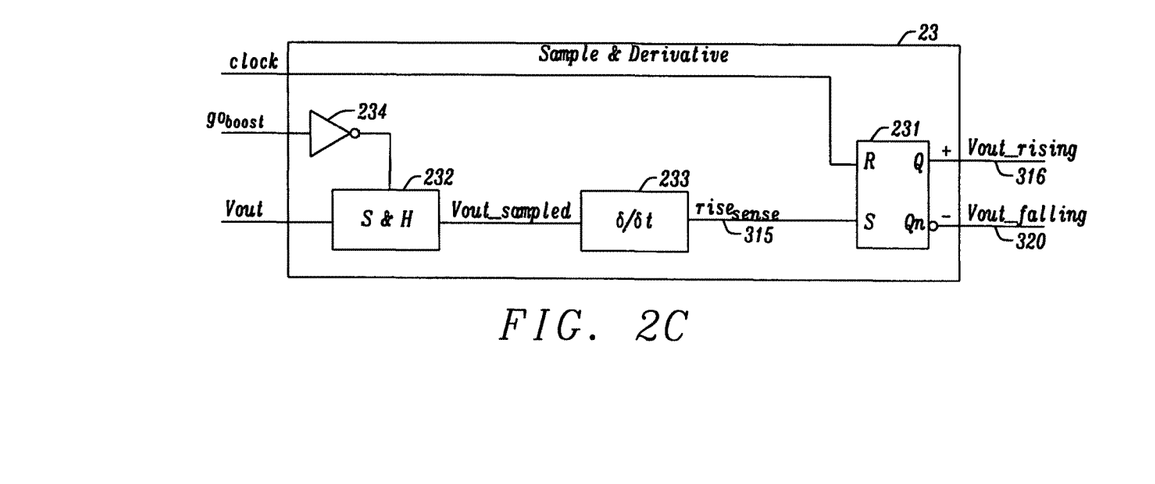
FIG. 2C shows in more detail an example of an embodiment of a derivate block configured to provide a derivative of the output voltage of the buck-boost converter.

FIG. 2C shows in more detail an example of an embodiment of the output voltage change monitoring block 23 as already shown in FIG. 2A. The output voltage change monitoring block 23 comprises an RS flip-flop 231, a sample&hold block 232, a derivate block 233 and an inverter block 234. The derivative function $\partial V_{OUT}/\partial t$ of block 233 is preceded with a sample and hold block 232, to cancel the ripple in boost mode when switch M3 253 is on. An RS Flip Flop 231 at the output of the output voltage change monitoring block 23 waits until the end of duty cycle before changing operating region. Otherwise high frequency operation might occur, leading to capacitive losses.

The output voltage change monitoring block 23 has three inputs. The first input is a clock pulse which is connected to a reset input of the RS flip-flop 231. The second input of the output voltage change monitoring block 23 is a pulse $Go_{boost}$ 318, which is an output of the duty cycle block 248. After inversion the $Go_{boost}$ pulse 318 enables the Sample&Hold block 232 which samples the output voltage Vout of the buck-boost converter 200, while the output voltage Vout is the third input of the output voltage change monitoring block 23. The sample and hold value of Vout is an input of the derivate block 233 providing the derivative $\partial V_{OUT}/\partial t$ of the output voltage Vout. The derivate block 233 generates a $rise_{sense}$ signal 315, which is a reset input of the RS flip-flop 231. The positive output of the RS flip-flop 231 is the Vout_rising 316 signal, Vout rising 316 is the rise_sense signal 315 synchronized to the clock on its falling edge. The negative output of the RS flip-flop 231 is the Vout_falling 320 signal. The positive output 316 of the output voltage change monitoring the output voltage change monitoring block 23 is the third input of the AND logic block 240. The negative output 320 of block 23 is the third input of AND logical block 241 and of the AND logical block 244.

The derivate of the output voltage is the indicator of coil current value versus load current, e.g. if coil current is less that load, then the output voltage Vout is falling. Thus monitoring $\Delta$VOUT helps on significant reduction of coil current ripple and output voltage ripple.

Furthermore the decision which operation region and which buck or boost cycle times to choose may also be alternatively based additionally on currents especially the one flowing through the inductor and the load. This means that the operation regions e.g. are defined based on relations of the output voltage to references voltages and additionally based on relations of the load current to the coil current and to one or more reference currents or based on the relations of either load current or coil current to one or more reference currents. Similar to the operation regions shown in table 1.2 where threshold voltages define the ranges of the output voltage, ranges of the output voltage and of the currents used for monitoring, are defined by threshold voltages and correspondently by threshold currents. The monitoring of the output voltage relations and of the load/coil current relations can be either performed by a number of comparators connected in parallel or by a state machine. The table 1.3 below shows an example how buck and boost cycles can be defined:

TABLE 1.3

| Condition $I_{load}$[1] $V_{out}$ vs. $V_{ref}$ | $I_{load} < I_0$ | $I_L < I_{load} < I_1$ | $I_1 < I_{load} < I_2$ |
|---|---|---|---|
| $V_{out} > V_{ref}$ | off | off | off |
| $V_{ref} > V_{out} > V_{ref}\text{-}\Delta V_1$ | $D_{buck,1}$[2] | $D_{buck,1}$ | $D_{buck,2}$ |
| $V_{ref}\text{-}\Delta V_1 > V_{out} > V_{ref}\text{-}\Delta V_2$ | $D_{buck,1}$[2] | $D_{buck,2}$ | $D_{buck,2}$ |
| $V_{ref}\text{-}\Delta V_2 > V_{out} > V_{ref}\text{-}\Delta V_3$ | $D_{buck,2}$ | $D_{buck,2}$ | $D_{buck,max}$ |
| $V_{ref}\text{-}\Delta V_3 > V_{out} > V_{ref}\text{-}\Delta V_4$ | $D_{buck,2}$ | $D_{buck,max}$ | $D_{boost,1}$ |
| $V_{ref}\text{-}\Delta V_4 > V_{out} > V_{ref}\text{-}\Delta V_5$ | $D_{buck,max}$ | $D_{boost,1}$ | $D_{boost,1}$ |
| $V_{ref}\text{-}\Delta V_5 > V_{out} > V_{ref}\text{-}\Delta V_6$ | $D_{boost,1}$ | $D_{boost,1}$ | $D_{boost,2}$ |
| $V_{ref}\text{-}\Delta V_6 > V_{out} > V_{ref}\text{-}\Delta V_7$ | $D_{boost,1}$ | $D_{boost,2}$ | $D_{boost,2}$ |
| $V_{ref}\text{-}\Delta V_7 > V_{out} > V_{ref}\text{-}\Delta V_8$ | $D_{boost,2}$ | $D_{boost,2}$ | $D_{boost,max}$ |

Numeral (1) means that the load current can also be indirectly determined by current measurement in the switches and the coil.

Numeral (2) means that two cells of the table above each other with identical duty cycles indicate that the load current change has typically less influence than the error voltage.

$\Delta V_1$ to $\Delta V_8$ are, similarly to table 1.2, threshold voltages to define ranges of the output voltage.

$I_1$ and $I_2$ are threshold current values to define ranges of the load current. $I_L$ stands for the coil current.

It has to be understood that table 1.3 shows only an example how the load and coil currents can be used to define the buck or boost cycle times. Other current comparisons can be used as well Moreover it should be noted that the operation regions or duty cycles can be defined also alternatively based on the error voltage and additionally also based on the relation of the supply voltage $V_g$, to the output voltage Vout, especially this may be considered when the supply voltage $V_g$ is measured already. If the supply $V_g$ is used to determine the operating mode then this mode depends normally on the ratio of $V_{out}/V_g$ which does mainly determine the Duty-cycle and the operation mode. Compared to table 1.2 additional ranges of the output voltage defined by additional threshold voltages are used. The monitoring of the output voltage relations and of the output voltage/supply voltage relations can be either performed by a number of comparators connected in parallel or by a state machine. The duty cycles according to the method described above can be defined similarly as the method described in table 1.3.

The hysteresis (described below) and boost-mode-sample-and-hold-circuit block 232 (to be described further in this text) helps suppressing these parasitic effects as described above as ripple in boost mode and high frequency operation.

A hysteretic comparator with symmetric hysteresis is used for $\partial V_{OUT}/\partial t$ monitor to suppress noise, parasitic effects due to ESR and ESL, and for having a more stable operating region. The hysteretic comparator is part of the sample and derivative block 233.

The drawback of this hysteresis is that it adds a delay of the $\partial V_{OUT}/\partial$ signal. The value of hysteresis can be kept as a programmability option Depending on a type of the output capacitor 255, if ESL creates significant output glitches that create false triggering on buck/boost mode comparators, a filter on Vout might be necessary (not shown).

Returning to FIG. 2B, the Buck duty cycle ($D_{buck}$) is set by buck timer block 249 at operating region 2. The timer block creates constant on-time pulses triggered by the fixed frequency of the clock signal.

The Boost duty cycle ($D_{boost}$) is set by boost timer block 248 at operating regions 4&5 according to table 1.2—implemented similar to the buck timer. The duty cycle for this operating region will be set by load transient specifications at lowest input supply corner. A low duty cycle boost operation is preferable to minimize coil ripple.

The output of the AND logical block 240 signals the buck mode of region 2 according to table 1.2 and is connected to buck timer block 249 which receives also the system clock pulses of the buck-boost converter. The buck timer block 249 implements the duty cycle D of the table 1.2, region 2.

The outputs of the AND logical blocks 241 and 242 signal both the 100% buck mode according to table 1.2 and are connected to the OR logical block 243. The outputs of buck timer block 249 and of the OR logical block 243 are both inputs of the OR logical block 250, wherein the output of the OR logical block 250 activates the switch 251 of the buck-boost converter.

The output of the AND logical block 244 signals the boost mode according to region 4 of the table 1.2, the output of the INVERTER logic block 245 signals the boost mode of region 5 according to table 1.2. Both outputs of blocks 244 and 245 are connected to block 248, which implements the duty cycle of the boost mode. The output of block 248 activates the switches 253 and 254 of the buck-boost converter.

The second input of the NOR logical block 247 is the output signal of the OR logical block 250. The output of the NOR logical block 247 activates the switch 252 of the buck-boost converter.

It should be noted that the logic blocks of the LOGIC and TIMER block 24 as shown in FIG. 2B are only an example of an implementation of the control of the buck-boost converter according to table 1.2. The logic relations of table 1.2 could also be implemented by different logic blocks.

Region changes might just happen from one region to the next region, but not over two regions. Only after a certain blanking time the next region change might happen.

In other words, instead of a direct region 4 to region 2 change, the system could decide to define the changes as first region 4, then region 3 (after a certain blanking time), then region 2.

This region change function can be enabled either at both increasing and decreasing region changes or can be preferred to be implemented at only falling (or rising) region change. (For the example of FIG. 4.4 and FIG. 4.5, only decreasing region change limitation is needed.)

It has to be noted that $D_{buck}$ and $D_{boost}$ don't have to be constant values. Their values can be set adaptively by digital assistance. The duty cycle values can be set to different values (e.g. $D_{buck1}$, $D_{buck2}$, $D_{buck3}$, $D_{buck4}$) by a state machine. The state machine can then define $D_{buck}$ and $D_{boost}$ depending on region transitions of Vout (versus Vref) and eventually on region transitions of the derivative of Vout.

Simulation Results:

For the following simulations, the switches of the Buck-Boost converter are ideal switches (M1 & M3) and diodes (M2 & M4) for simplicity of signaling and understanding basic system behavior (Ron=100 mΩ). Unless otherwise stated ESR=1 mΩ, L=1 uH and C=30 uF. The operating frequency is in a range between 3 and 6 MHz. These values are only examples; other values could be implemented as well.

The following numerals are applied to the time diagrams of FIGS. 3A-3F:

The same numerals are also applied to FIGS. 2B and 2C.

| | | |
|---|---|---|
| 311- coil current | 312 - load current | 313 - voltage buck mode |
| 314 -boost mode | 315 - rise_sense sign | 316 - Vout rising |
| 317 - go$_{buck}$ pulse | 318 - go$_{boost}$ pulse | 319 - Vout |
| 320 - Vout_sampled | 321 - Vg (supply) | |

Signals 313 to 318 are digital signals. Therefore they might eventually only have a 0/1 on the y axis and no voltages.

Figure 3A:
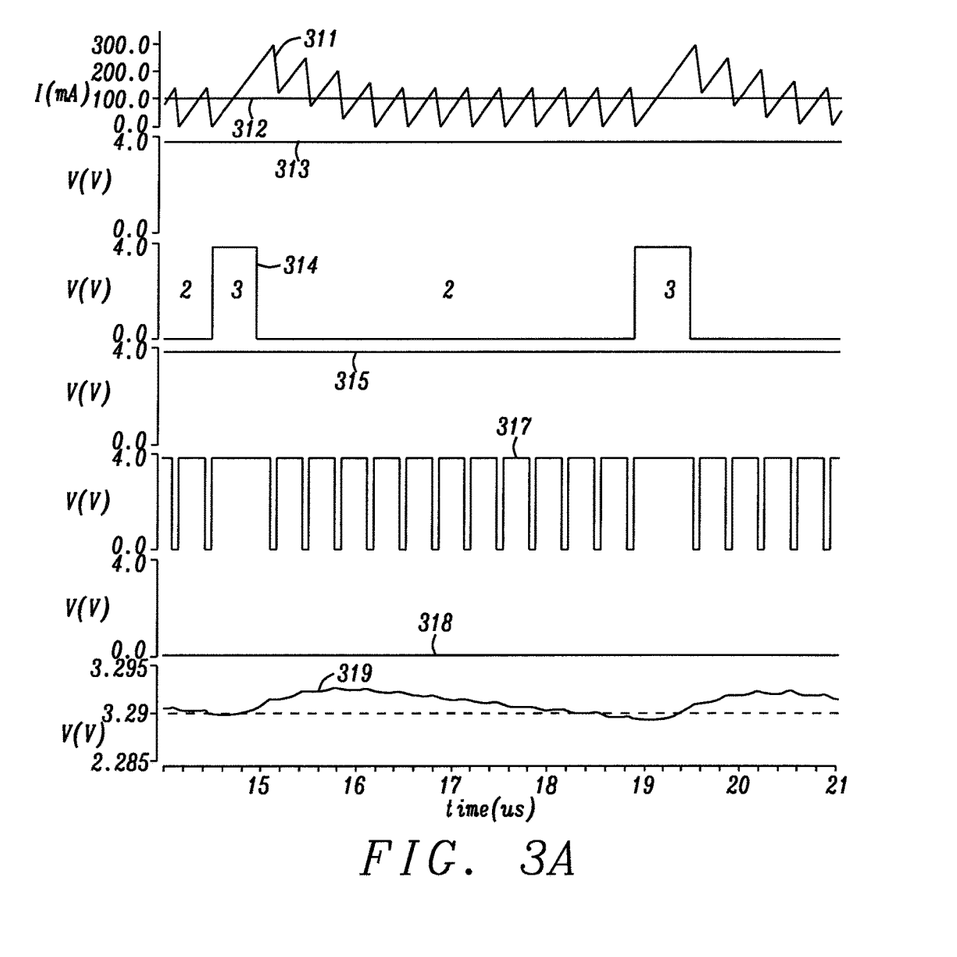
FIG. 3A illustrates detailed information on system operation of the converter proposed for $V_g$=3.8V, $V_{OUT}$=3.3V, $I_{LOAD}$=100 mA.

FIG. 3A gives detailed information on system operation for example $V_{IN}$=3.8V, $V_{OUT}$=3.3V, $I_{LOAD}$=100 mA. A 3.13 mV output voltage ripple is observed. As the change in Vout is small $\partial V_{OUT}/\partial t$ monitor comparator stays high due to hysteresis.

At first couple of microseconds, the output voltage of the buck-boost converter Vout is higher than 3.29V (Vref–$\Delta V_1$), so the system is in operating region 2; a high duty cycle operation (D=85%) is observed until Vout is below 3.29V. After that, the operating region switches to 3, the buck switch is always on. During this time Vout increases above 3.29V and the system moves to operating region 2. There are no boost pulses observed.

Due to the hysteresis of the $dV_{OUT}/dt$ monitor 204 the Vout_rising signal 316 is staying at logic 1, even though Vout is actually falling between 16 us-19 us.

Figure 3B:
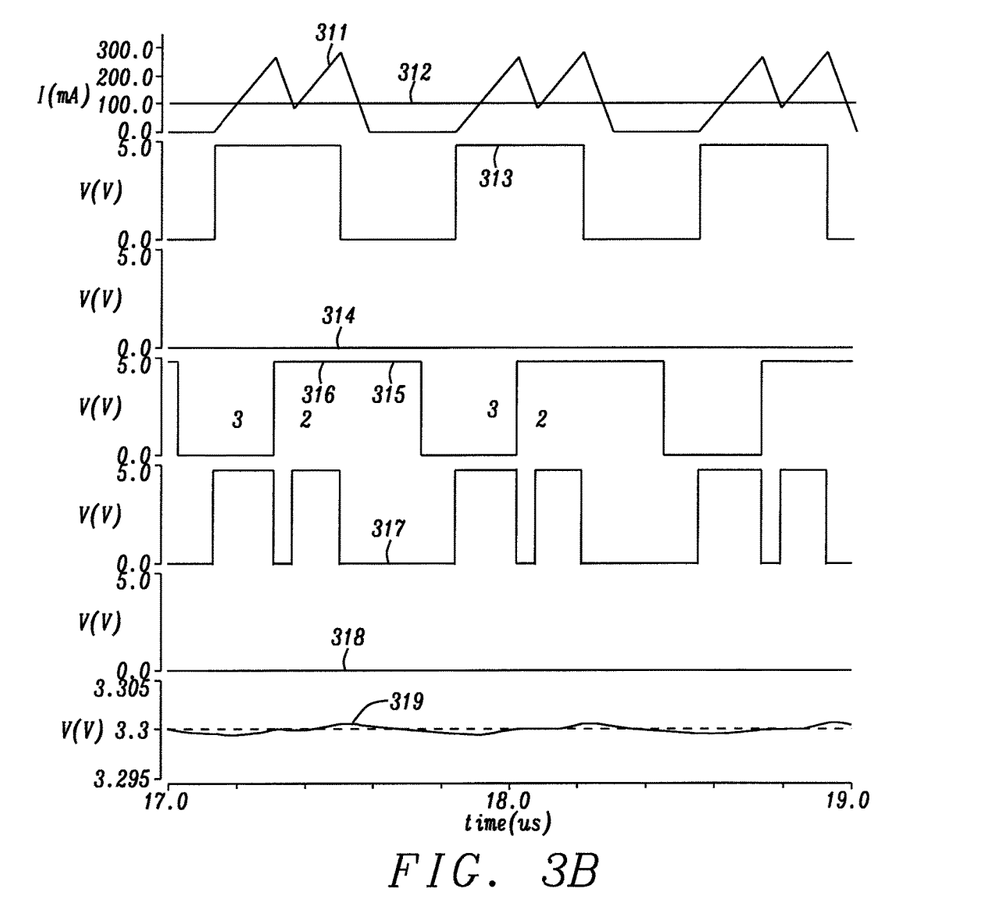
FIG. 3B shows detailed information on system operation for $V_g$=4.8V, $V_{OUT}$=3.3V, $I_{LOAD}$=1 00 mA.

FIG. 3B gives detailed information on system operation for $V_g$=4.8V, $V_{OUT}$=3.3V, $I_{LOAD}$=100 mA. A 1.1 mV output voltage ripple is observed.

At t=17.0 μs, Vout is greater than 3.3V, so system is in operating region 1; switches are off and output voltage is falling due to load current.

At the time Vout is falls below 3.3V, "Vout_rising" 316 is low, so the system is in operating region 3; the buck switch is always on.

When "Vout_rising" 316 is high, a buck pulse is observed, until Vout>3.3.

Figure 3C:
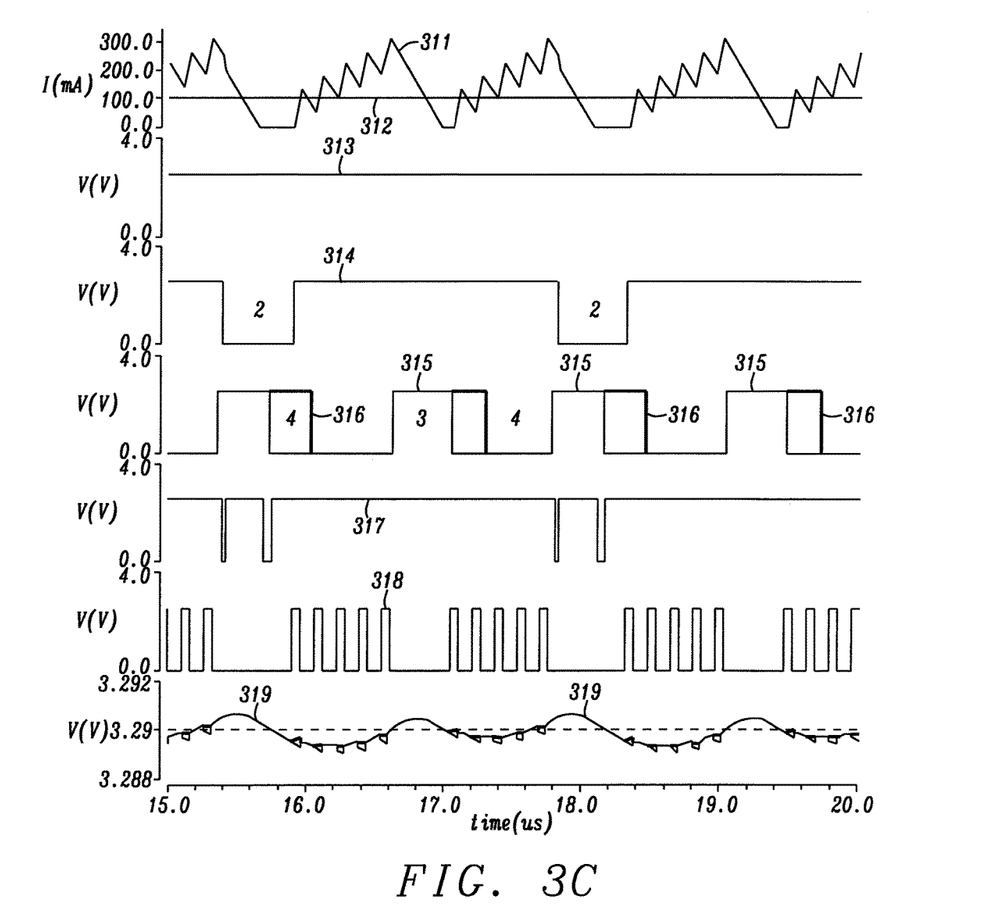
FIG. 3C shows detailed information on system operation for $V_g$=2.5V, $V_{OUT}$=3.3V, $I_{LOAD}$=100 mA.

FIG. 3C gives detailed information on system operation for $V_g$=2.5V, $V_{OUT}$=3.3V, $I_{LOAD}$=100 mA. A 1.61 mV output voltage ripple is observed.

At t=15.4 μs, Vout is greater than 3.29V (Vref–$\Delta V_1$), so system is in operating region 2; a high duty cycle operation (D=85%) is observed until Vout is below 3.29V (t=15.8 μs).

It should be noted that the first buck-min-off pulse 317 at t=15.4 μs is shorter than expected, this is due to a current implementation of the buck timer 249: The timer starts working with "Vout_rising" signal 316 not with the "boost_mode" signal. Furthermore "Vout_rising" 316 changes state after buck duty cycle is completed at t=16.03 μs due to the RSflip-flop in FIG. 2C).

The "boost_mode" signal is triggered when Vout is smaller than Vref–$\Delta V_1$=3.29V.

At t=15.9 μs region 4 operation starts with "boost_mode" signal rising high and "rise_sense=0. In this region we observe boost pulses with D=D$_{boost}$.

At t=16.6 μs region 3 operation is observed with boost_mode signal still high and rise_sense" signal=1. (This region of operation is also defined as boost mode with D=0).

At t=17.05 μs region 4 operation starts with "boost_mode" signal still high and "rise_sense"=0.

At t=17.8 μs region 2 operation resumes with falling of "boost_mode" signal and "Vout_rising"=1.

As a system detail, boost pulses start with "rise_sense" signal which is the output of $\partial V_{OUT}/\partial t$ comparator, direct connection is implemented to speed up the response.

Increasing dV/dt hysteresis can also help on eliminating these effects.

Previously mentioned digital assisted system improvements can be utilized for this simulation result. For example at t=17.8 μs, buck_sw is off for a very short time frame. If mode transition from high to low (region 4 to 2) is done by one-at-a-time technique then this switching would be eliminated enhancing system performance.

When "rise_sense" 315 s high and (Vref–$\Delta V_1$>Vout>Vref–$\Delta V_2$), the system is in region 3, thus no boost pulses are observed. Coil current is decaying to zero in this region as $V_g<V_{OUT}$.

Figure 3D:
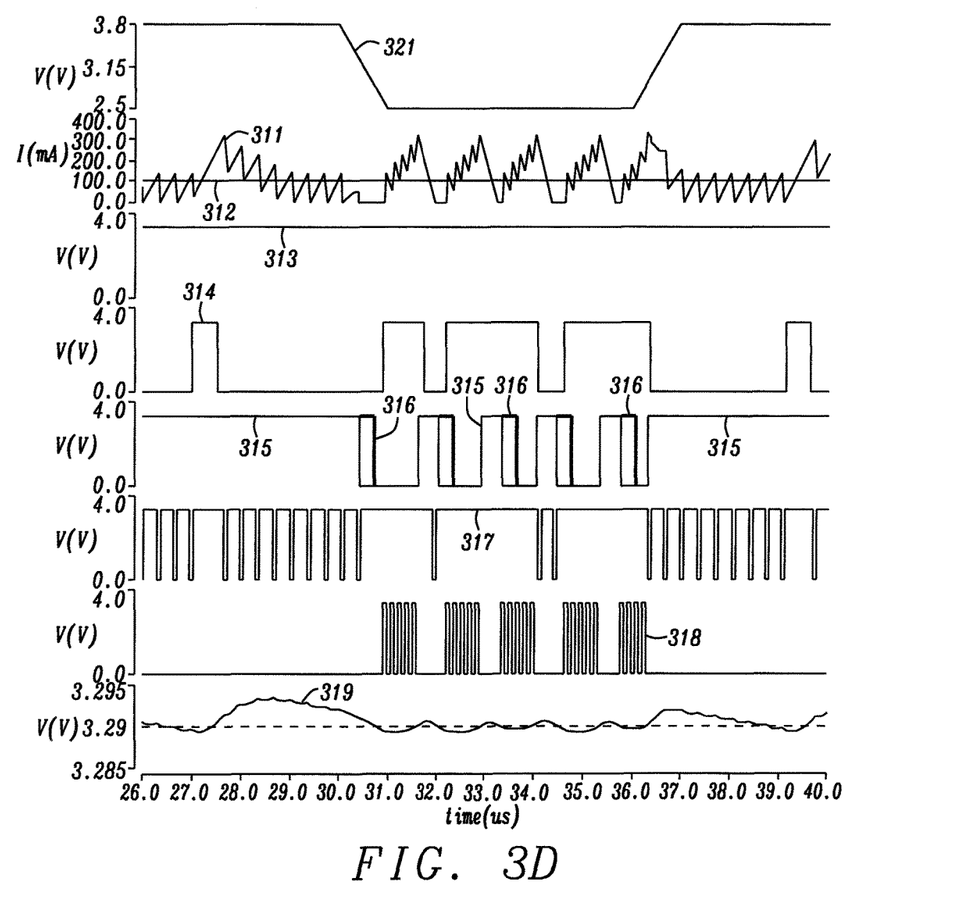
FIG. 3D shows a line transient response where $V_g$ falls from 3.8V to 2.5V at $I_{LOAD}$=100 mA, $V_{OUT}$=3.3V.

FIG. 3D gives a line transient response where $V_g$ falls from 3.8V to 2.5V at $I_{LOAD}$=100 mA, $V_{OUT}$=3.3V. A 3.6 mV transient of the output voltage is observed.

In a separate transient simulation (not shown) sweeping the defined range of load currents (100 m→500 mA) and supply voltages (2.5V→4.8V), maximum observed ripple is found as 12.5 mV. The simulation conditions were: L=1 uH Cout=30 uF ESR=1 m ESL=0, leading to an operating frequency in a range between 3-6 MHz.

Figure 3E:
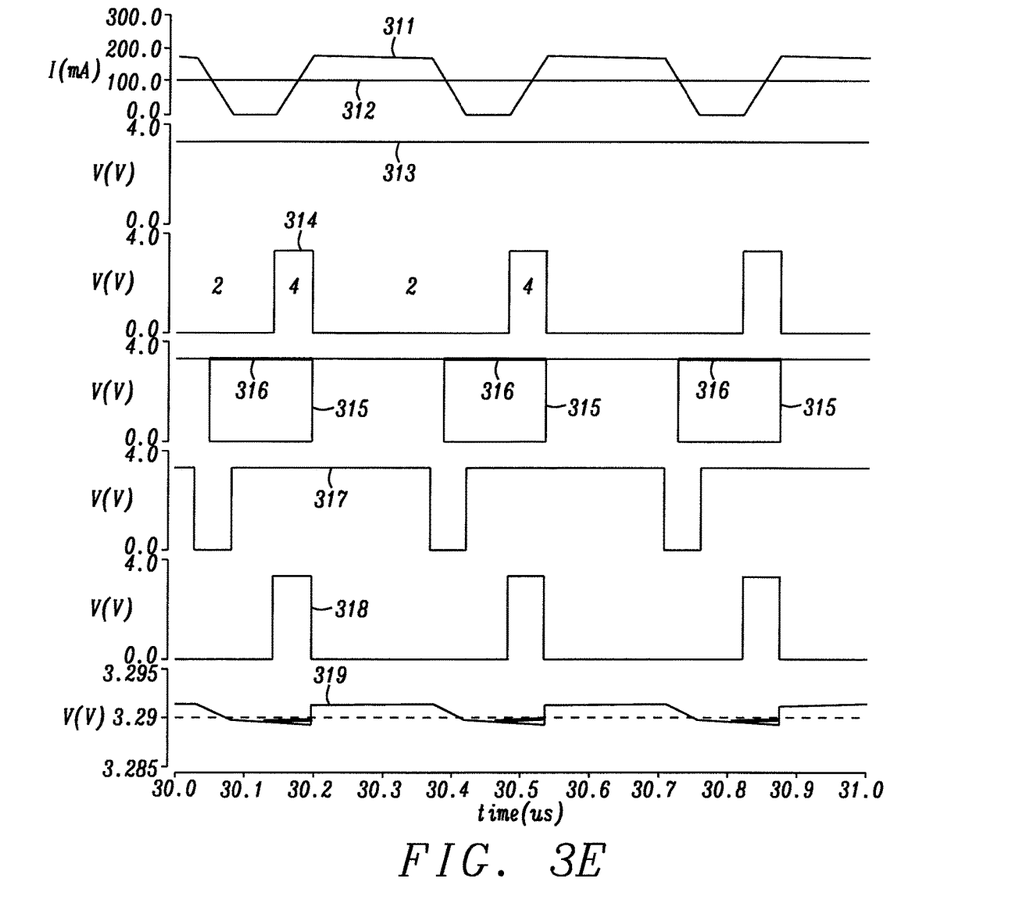
FIG. 3E depicts detailed information on system operation for $V_g$=3.3V, $V_{OUT}$=3.3V, $I_{LOAD}$=100 mA.

FIG. 3E gives detailed information on system operation for $V_g$=3.3V, $V_{OUT}$=3.3V, $I_{LOAD}$=100 mA. A 2.1 mV output voltage ripple is observed. The simulation parameters are: L=1 uH Cout=30 uF ESR=10 m. Concurrent Buck and Boost pulses are observed.

Similar to FIG. 3C, in FIG. 3E the system enters in region 4 reacting on the "rise_sense" signal 315 in boost mode.

Figure 3F:
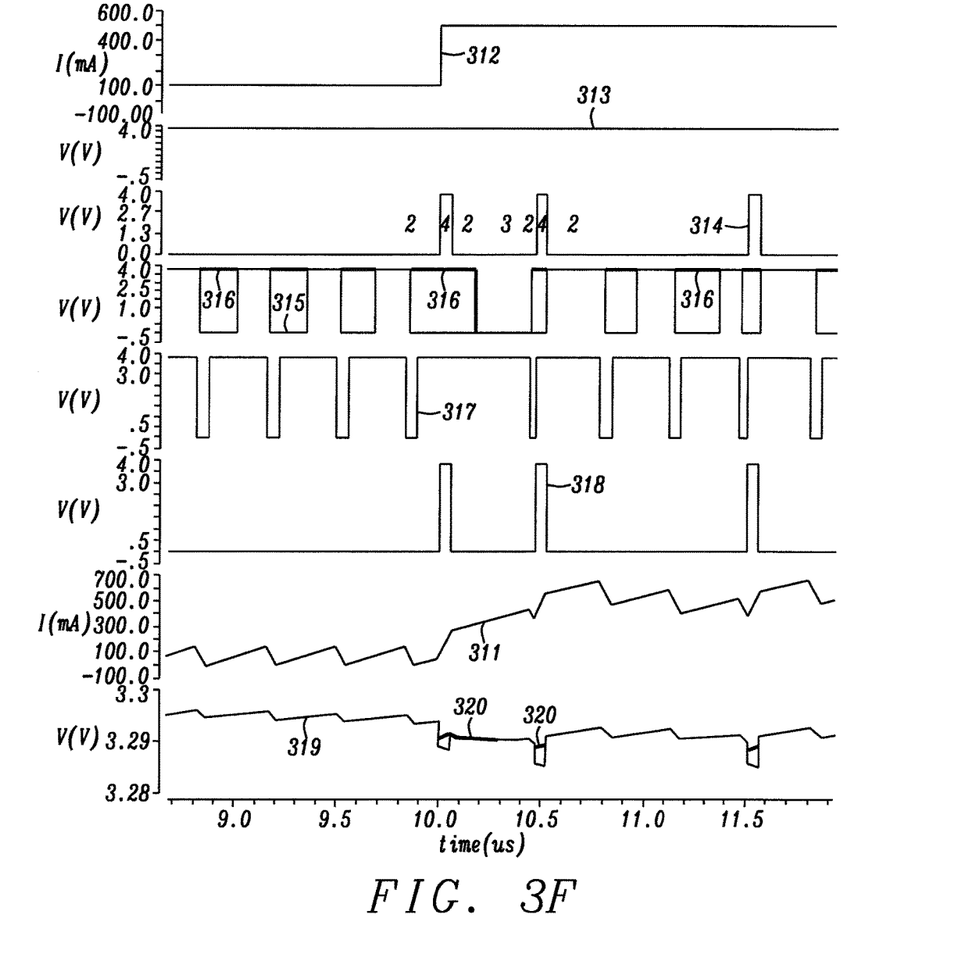
FIG. 3F gives rising load transient simulation results for $V_g$=3.8V, $V_{OUT}$=3.3V, L=1 uH, Cout=30 uF ESR=10 mΩ, $I_{LOAD}$=100 mA→500 mA.

FIG. 3F gives rising load transient simulation results for $V_g$=3.8V, $V_{OUT}$=3.3V, L=1 μH, Cout=30 μF ESR=10 m, $I_{LOAD}$=100 mA→500 mA.

Figure 4:
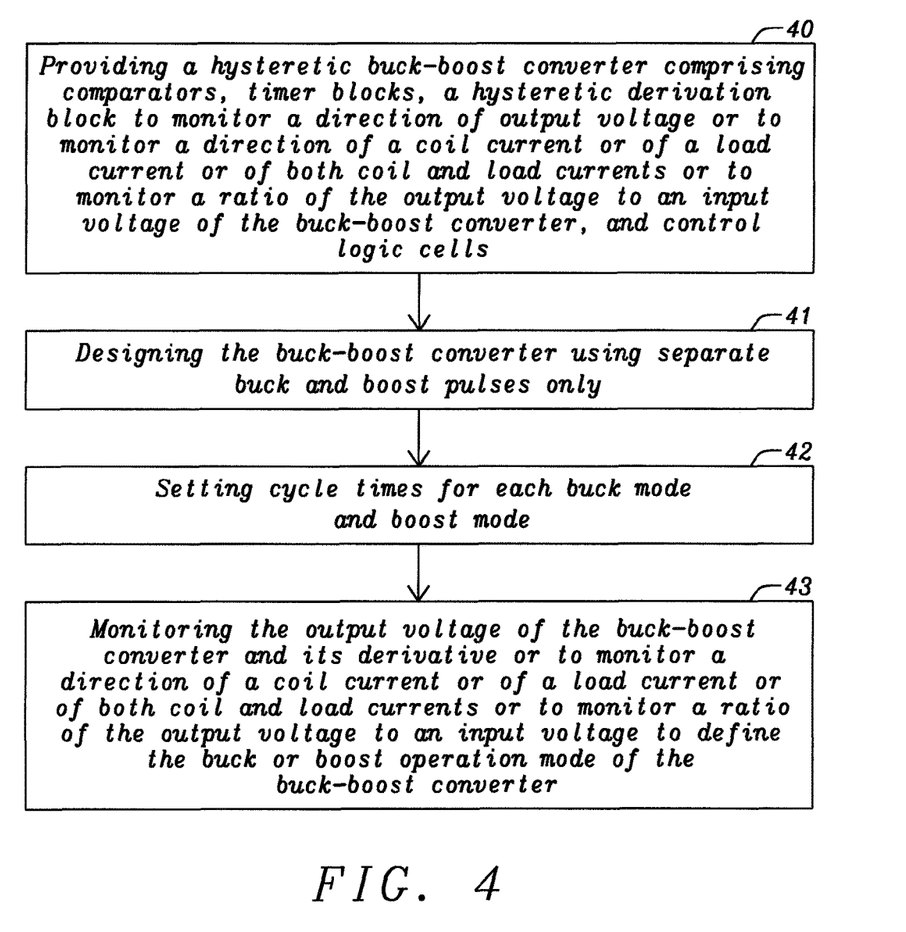
FIG. 4 shows a flowchart of a method to create a hysteretic buck-boost converter with a simplified topology without a modulator block and without frequency compensation

FIG. 4 shows a flowchart of a method to create a hysteretic buck-boost converter with a simplified topology without a modulator block and without frequency compensation. A first step 40 illustrates provision of a hysteretic buck-boost converter comprising comparators, timer blocks, a derivation block to monitor a direction of an output voltage change or to monitor a direction of a coil current or of a load current or of both coil and load currents, and control logic cells. Step 41 describes designing the buck-boost converter using separate buck and boost pulses only. Step 42 describes setting cycle times for both buck mode and boost mode. Step 43 describes monitoring the output voltage of the buck-boost converter and its derivative or to monitor a direction of a coil current or of a load current or of both coil and load currents to define the buck or boost operation mode of the buck-boost converter.

While the disclosure has been particularly shown and described with reference to the preferred embodiments thereof, it will be understood by those skilled in the art that various changes in form and details may be made without departing from the spirit and scope of the disclosure.

What is claimed is:

1. A hysteretic buck-boost converter system, separating buck and boost pulses, wherein operation regions and buck or boost cycles of the buck-boost converter are controlled based on monitoring an output voltage of the buck-boost converter and a difference between the output voltage of the buck-boost converter and a reference voltage (error voltage), comprising:
   a buck-boost converter configured to provide the output voltage which can be higher or lower than an input voltage of the buck-boost converter, comprising an inductor and separate switches for buck and boost operation where in a given cycle either switches for buck operation or switches for boost operation are configured to switch;

an input stage monitoring the output voltage of the buck-boost converter, comprising a number of comparators connected in parallel wherein a first comparator compares the output voltage of the buck-boost converter with a reference voltage and each of the other comparators detects if the output voltage of the buck-boost falls into a voltage interval lower than the reference voltage, wherein the voltage interval is different for each of the other comparators, wherein an output of each comparator is an input to a logic and timers block;

an output voltage change monitoring block configured to detect if the output voltage is falling or rising, wherein the output of the output voltage change monitoring block, providing a derivative $\partial V_{OUT}/\partial t$ of the output voltage, is an additional input to said logic and timers block; and said logic and timers block, configured to define an operation region of buck or boost operation modes and buck or boost cycle times depending on the input of the comparators and where in a given cycle the logic and timers block is configured to activate the buck or boost switches of the buck-boost converter according to the operation region defined by the logic and timers block, wherein the operation regions depend on how far the output voltage of the buck-boost converter is away from the reference voltage.

2. The buck-boost converter system of claim 1, wherein the output voltage change monitoring block comprises a sample and hold circuit block configured to sample and hold the output voltage of the buck-boost converter, a derivative circuit block, receiving input from the sample and hold block and configured to generate a derivative of the output voltage of the buck-boost converter and a flip-flop receiving on a set-input an output signal from the derivative circuit block and on a reset input a clock signal, wherein a first output of the flip-flop indicates if the output voltage of the buck-boost converter is rising and a second output of the flip-flop indicates if the output voltage of the buck-boost converter is falling.

3. The buck-boost converter system of claim 1, wherein the logic and timers block comprises a number of logic gates and timer blocks, which are configured to set, depending on the outputs of the input stage, buck or boost duty cycles, wherein a buck timer block is configured to set the buck cycle time and a boost timer block is configured to set the boost cycle time.

4. The buck-boost converter system of claim 2 wherein a hysteretic comparator, which suppresses ripples of an input of the derivative block is incorporated in the derivative block.

5. The buck-boost system of claim 3, wherein the buck-boost converter further comprises an output voltage change monitoring block configured to detect if the output voltage falls or rises, wherein the output of the output voltage change monitoring block is an additional input to said logic and timers block and wherein, if the output voltage of the buck-boost converter is higher than the reference voltage then an operation region 1 is assigned and all switches of the buck-boost converter are set off, if the output voltage of the buck-boost converter is lower than the reference voltage and higher than the output voltage of the buck-boost converter minus a first threshold voltage and the output voltage of the buck-boost converter is rising, then an operation region 2 is assigned, which means the buck mode switches are closed using buck cycle time set by the buck timer block, if the output voltage of the buck-boost converter is lower than the reference voltage and higher than the output voltage of the buck-boost converter minus a first threshold voltage and the output voltage of the buck-boost converter is falling, then an operation region 3 is assigned, which means the buck mode switches are closed using 100% buck cycle time or the boost switches are closed using 0% boost cycle time, if the output voltage of the buck-boost converter is lower than the reference voltage minus the first threshold voltage and higher than the output voltage of the buck-boost converter minus a second threshold voltage and the output voltage of the buck-boost converter is rising, then the operation region 3 is also assigned, which means the buck mode switches are closed using 100% buck cycle time or the boost switches are closed using 0% boost cycle time, if the output voltage of the buck-boost converter is lower than the reference voltage minus the first threshold voltage and higher than the output voltage of the buck-boost converter minus a second threshold voltage and the output voltage of the buck-boost converter is falling, then the operation region 4 is assigned, which means the boost mode switches are closed using boost cycle time set by the boost timer block and if the output voltage of the buck-boost converter is lower than the reference voltage minus the second threshold voltage then the operation region 5 is assigned, which means the boost mode switches are closed using 100% boost cycle time.

6. The buck-boost converter system of claim 5, wherein the buck and boost duty cycles are set by a state machine or a CPU to variable values wherein the buck and boost duty cycles depend on input supply voltage, reference voltage, operation region transitions or derivatives of the output voltage of the buck boost converter.

7. A hysteretic buck-boost converter system, separating buck and boost pulses, wherein operation regions and buck or boost cycles of the buck-boost converter are controlled based on monitoring an output voltage of the buck-boost converter and a difference between the output voltage of the buck-boost converter and a reference voltage (error voltage) and additionally based on relations of the load current to the coil current and to one or more reference currents or based on the relations of either the load current or the coil current to one or more reference currents, comprising:

a buck-boost converter configured to provide the output voltage which can be higher or lower than an input voltage of the buck-boost converter, comprising an inductor and separate switches for buck and boost operation where in a given cycle either switches for buck operation or switches for boost operation are configured to switch;

an input stage configured to monitor the output voltage of the buck-boost converter in relation to reference voltages and to monitor the load current in relation to the coil current and to one or more reference currents or to monitor the coil current in relation to the one or more reference currents, wherein the monitoring is performed either by a number of comparators connected in parallel or by a state machine and wherein the outputs of the input stage are inputs to a logic and timers block;

an output voltage change monitoring block configured to detect if the output voltage is falling or rising, wherein the output of the output voltage change monitoring block, providing a derivative $\partial V_{OUT}/\partial t$ of the output voltage, is an additional input to said logic and timers block; and said logic and timers block, configured to define an operation region of buck or boost operation modes and buck or boost cycle times, wherein the logic and timers block comprises a number of logic gates and timer blocks, which are configured to set, depending on the outputs of the input stage, buck or boost duty cycles, wherein the buck timer block is configured to set the buck cycle time and a boost timer block is configured to set the boost cycle time, where in a given cycle the logic and timers block is configured to activate the buck or boost switches of the buck-boost converter according to the operation region defined by the logic and timers block.

8. A hysteretic buck-boost converter system, separating buck and boost pulses, wherein operation regions and buck or boost cycles of the buck-boost converter are controlled based on monitoring an output voltage of the buck-boost converter and a difference between the output voltage of the buck-boost converter and a reference voltage (error voltage) and additionally based on monitoring a ratio of the output voltage to a supply voltage of the buck-boost converter, comprising:

a buck-boost converter configured to provide the output voltage which can be higher or lower than an input voltage of the buck-boost converter, comprising an inductor and separate switches for buck and boost operation where in a given cycle either switches for buck operation or switches for boost operation are configured to switch;

an input stage configured to monitor the output voltage of the buck-boost converter in relation to reference voltages and to monitor a relation of the output voltage current in relation to the supply voltage, wherein ranges of the output voltage, limited by threshold voltages, are used, wherein the monitoring is performed either by a number of comparators connected in parallel or by a state machine and wherein the outputs of the input stage are inputs to a logic and timers block;

an output voltage change monitoring block configured to detect if the output voltage is falling or rising, wherein the output of the output voltage change monitoring block, providing a derivative $\partial V_{OUT}/\partial t$ of the output voltage, is an additional input to said logic and timers block; and said logic and timers block, configured to define an operation region of buck or boost operation modes and buck or boost cycle times, wherein the logic and timers block comprises a number of logic gates and timer blocks, which are configured to set, depending on the outputs of the input stage, buck or boost duty cycles, wherein the buck timer block is configured to set the buck cycle time and a boost timer block is configured to set the boost cycle time, where in a given cycle the logic and timers block is configured to activate the buck or boost switches of the buck-boost converter according to the operation region defined by the logic and timers block.

9. A method to improve operation of buck-boost converters, comprising the steps of:

(1) providing a hysteretic buck-boost converter comprising comparators, timer blocks, a hysteretic derivation block to monitor a direction of output voltage by a derivative $\partial V_{OUT}/\partial t$ of the output voltage or to monitor a coil current or of a load current or of both coil and load currents or to monitor a ratio of the output voltage to an input voltage of the buck-boost converter, and control logic cells;

(2) designing the buck-boost converter using separate buck and boost pulses only;

(3) setting cycle times for both buck mode and boost mode; and (4) monitoring the output voltage of the buck-boost converter and the derivative $\partial V_{OUT}/\partial t$ of the output voltage or to monitor a direction of a coil current or of a load current or of both coil and load currents or to monitor a ratio of the output voltage to an input voltage to define the buck or boost operation mode of the buck-boost converter.

10. The method of claim 9 wherein the buck and boost duty cycles are set by a state machine or a CPU to variable values wherein the buck and boost duty cycles depend on input supply voltage, reference voltage, operation region transitions or derivatives of the output voltage of the buck boost converter.

11. The method of claim 9, wherein the sample and derivative circuit block comprises a sample and hold circuit block configured to sample and hold the output voltage of the buck-boost converter, a derivative circuit block, receiving input from the sample and hold block and configured to generate a derivative of the output voltage of the buck-boost converter and a flip-flop receiving on a set-input an output signal from the derivative circuit block and on a reset input a clock signal, wherein a first output of the flip-flop indicates if the output voltage of the buck-boost converter is rising and a second output of the flip-flop indicates if the output voltage of the buck-boost converter is falling.

12. The method of claim 9 wherein a hysteretic comparator, which suppresses ripples of an input of the derivation block is incorporated in the derivation block.

13. The method of claim 9 wherein it is additionally monitored if the output voltage of the buck-boost converter rises or falls.

14. The method of claim 13 wherein said monitoring if the output voltage rises or falls is performed by a derivation block configured to derivate the output voltage over time.

* * * * *